(12) United States Patent
Bhargava et al.

(10) Patent No.: US 10,653,975 B2
(45) Date of Patent: May 19, 2020

(54) NETWORK OF DIVIDING-WALL COLUMNS IN COMPLEX PROCESSING UNITS

(71) Applicant: GTC Technology US LLC, Houston, TX (US)

(72) Inventors: Manish Bhargava, Katy, TX (US); Roomi Kalita, Houston, TX (US); Amit Kanda, Katy, TX (US)

(73) Assignee: GTC Technology US LLC, Houston, TX (US)

( * ) Notice: Subject to any disclaimer, the term of this patent is extended or adjusted under 35 U.S.C. 154(b) by 0 days.

(21) Appl. No.: 16/396,663

(22) Filed: Apr. 27, 2019

(65) Prior Publication Data

US 2019/0329151 A1    Oct. 31, 2019

Related U.S. Application Data

(60) Provisional application No. 62/664,762, filed on Apr. 30, 2018.

(51) Int. Cl.
*B01D 3/14* (2006.01)
*C10G 35/00* (2006.01)

(52) U.S. Cl.
CPC ............. *B01D 3/141* (2013.01); *B01D 3/146* (2013.01); *C10G 35/00* (2013.01)

(58) Field of Classification Search
CPC ......... B01D 3/141; B01D 3/146; C10G 35/00
See application file for complete search history.

(56) References Cited

U.S. PATENT DOCUMENTS

| | | | |
|---|---|---|---|
| 2,953,524 A * | 9/1960 | Rich, Jr. | B01D 3/143 208/350 |
| 3,131,235 A * | 4/1964 | Asselin | C07C 9/16 585/737 |
| 6,416,658 B1 | 7/2002 | Maraschino et al. | |
| 6,540,907 B1 * | 4/2003 | Towler | B01D 3/141 208/211 |
| 7,267,746 B1 | 9/2007 | Harris et al. | |
| 7,485,768 B1 * | 2/2009 | Rice | C10G 35/00 208/133 |

(Continued)

FOREIGN PATENT DOCUMENTS

WO    WO-2017/050795 A1    3/2017
WO    WO2017050795 A1 *   3/2017   ............... C10G 5/02

OTHER PUBLICATIONS

Caballero, Jose and Grossman, Ignacio. (2014). Distillation: Fundamentals and Principles—Optimization Background. Chapter 11: Optimization of Distillation Processes. Editors: Górak, Andrzej; Sorensen, Eva. Elsevier. (Year: 2014).*

(Continued)

*Primary Examiner* — Youngsul Jeong
*Assistant Examiner* — Gabriel E Gitman
(74) *Attorney, Agent, or Firm* — Winstead PC

(57) ABSTRACT

A processing unit includes a naphtha hydrotreating unit comprising a first divided wall column, a naphtha splitter system, and a deisopentanizer column coupled to an output of a naphtha splitter of the naphtha splitter system, an isomerization unit coupled to an outlet of the deisopentanizer column, and a second divided wall column. The processing unit also includes an isomerization reactor coupled between the deisopentanizer column and the stabilizer column.

19 Claims, 3 Drawing Sheets

(56) References Cited

U.S. PATENT DOCUMENTS

| | | | |
|---|---|---|---|
| 8,609,922 B2* | 12/2013 | Werba | B01D 3/007 |
| | | | 585/478 |
| 2006/0270885 A1* | 11/2006 | Boyer | C07C 5/2791 |
| | | | 585/741 |
| 2009/0188837 A1 | 7/2009 | Podrebarac | |
| 2012/0004478 A1 | 1/2012 | Umansky et al. | |
| 2012/0184793 A1* | 7/2012 | Shecterle | C10G 45/62 |
| | | | 585/738 |
| 2014/0231238 A1* | 8/2014 | Bhargava | B01D 3/322 |
| | | | 202/161 |
| 2015/0211790 A1* | 7/2015 | Bhargava | B01D 3/141 |
| | | | 62/625 |
| 2016/0046544 A1 | 2/2016 | Molinier et al. | |
| 2017/0044447 A1* | 2/2017 | Pigourier | C10G 45/58 |
| 2017/0050899 A1 | 2/2017 | Tinger et al. | |

OTHER PUBLICATIONS

Babu, M. K. G., & Subramanian, K. A. (2013). Alternative transportation fuels: Utilisation in combustion engines. Boca Raton, FL: CRC Press, Taylor & Francis. p. 60. Google Books. (Year: 2013).*

* cited by examiner

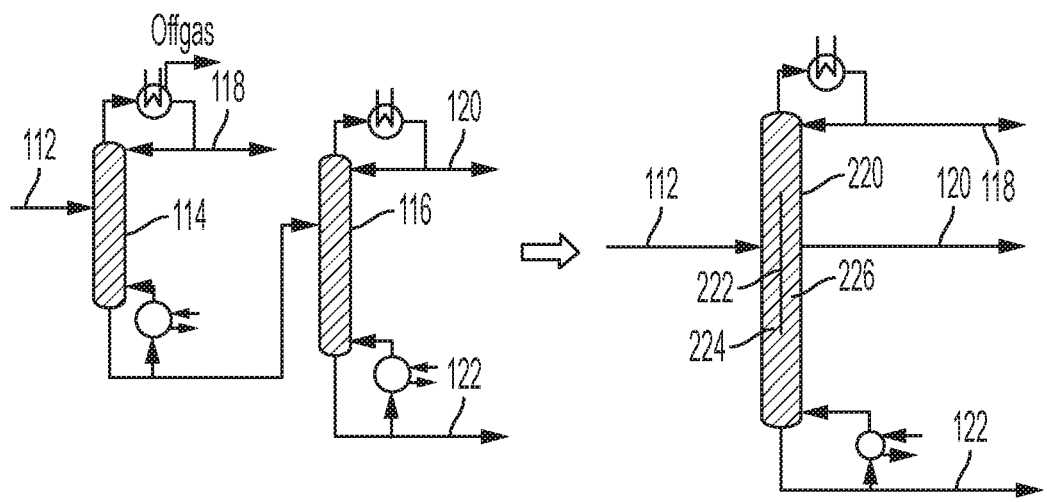
FIG. 3A PRIOR ART
FIG. 3B
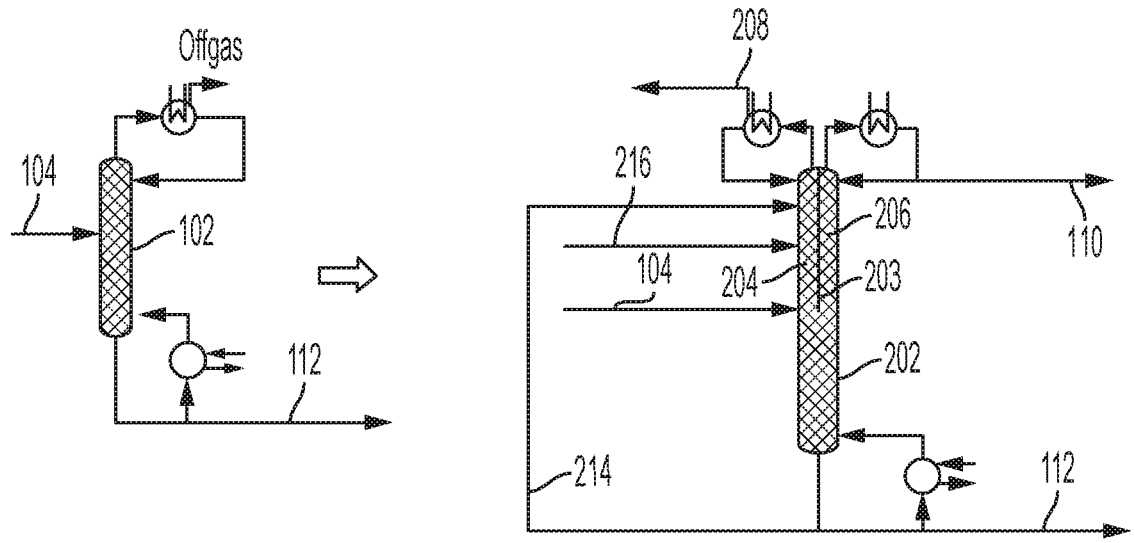
FIG. 4A PRIOR ART
FIG. 4B

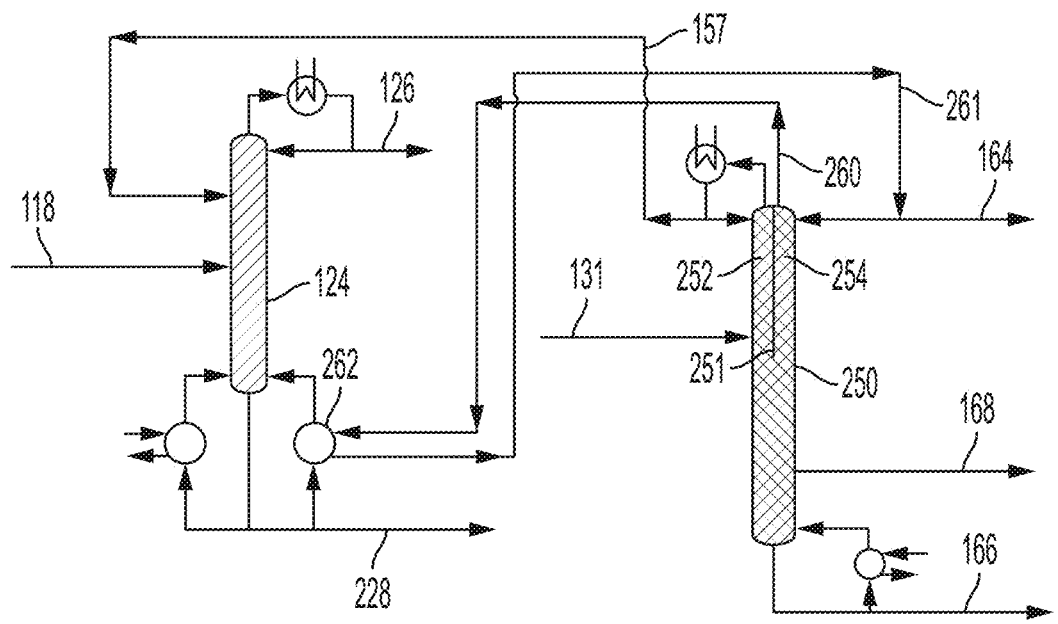
FIG. 5
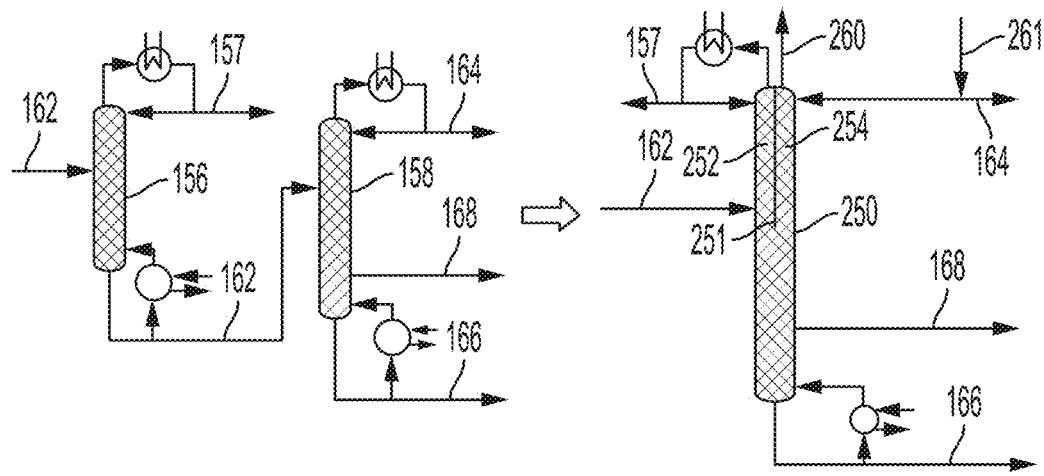
FIG. 6A
PRIOR ART
FIG. 6B

NETWORK OF DIVIDING-WALL COLUMNS IN COMPLEX PROCESSING UNITS

CROSS-REFERENCE TO RELATED APPLICATIONS

This patent application claims priority from, and incorporates by reference the entire disclosure of, U.S. Provisional Patent Application No. 62/664,762 filed on Apr. 30, 2018.

BACKGROUND

This section provides background information to facilitate a better understanding of the various aspects of the disclosure. It should be understood that the statements in this section of this document are to be read in this light, and not as admissions of prior art.

The majority of dividing wall column (DWC) applications in the refining industry consist of standalone columns, whether a retrofit or a grassroots column. Functional DWCs are commonly encountered in naphtha splitters and reformate splitters.

SUMMARY

An illustrative processing unit includes a naphtha hydrotreating unit comprising a first divided wall column. The first divided wall column includes: a wall dividing a top portion of the first divided wall column into a first top section and a second top section; an outlet associated with the second top section of the first divided wall column for recovery of liquid petroleum gas; an outlet associated with a bottoms portion of the first divided wall column and coupled to a naphtha splitter system. The illustrative processing unit also includes a deisopentanizer column coupled to an output of the naphtha splitter, an isomerization unit coupled to an outlet of the deisopentanizer column and including a second divided wall column. The second divided wall column includes: a wall dividing a top portion of the second divided wall column into a first top section and a second top section; an inlet coupled to an outlet of a stabilizer column of the isomerization unit; an outlet associated with the second top section of the second divided wall column for recovery of a first isomerate stream; and an outlet associated with a bottoms portion of the second divided wall column for recovery of a second isomerate stream. The illustrative process also includes an isomerization reactor coupled between the deisopentanizer column and the stabilizer column.

An illustrative heat-integrated process for a system including a naphtha hydrotreating unit and an isomerization unit includes providing a feed to a first divided wall column. The first divided wall column includes: a wall dividing a top portion of the first divided wall column into a first top section and a second top section, an outlet associated with the second top section of the first divided wall column for recovery of liquid petroleum gas; an outlet associated with a bottoms portion of the first divided wall column and coupled to a naphtha splitter system. The illustrative process includes removing liquid petroleum gas from the second top section of the first divided wall column and feeding a bottoms product from the first divided wall column to a second divided wall column. The second divided wall column includes: a wall dividing a middle portion of the second divided wall column into a first middle section and a second middle section; an inlet coupled to the bottoms portion of the first divided wall column; an outlet associated with a top portion of the second divided wall column for recovery of a first naphtha stream; an outlet associated with the second middle section for recovery of a second naphtha stream; and an outlet associated with a bottoms portion of the second divided wall column for recovery of a third naphtha stream. The illustrative process includes feeding the first naphtha stream from the top portion of the second divided wall column to a deisopentanizer column, feeding a bottoms fraction from the deisopentanizer column to an isomerization reactor, and feeding a product from the isomerization reactor to a stabilizer column, feeding isomerate from the stabilizer column to a third divided wall column. The third divided wall column includes: a wall dividing a top portion of the third divided wall column into a first top section and a second top section; an inlet coupled to an outlet of a stabilizer column of the isomerization unit; an outlet associated with the second top section of the third divided wall column for recovery of a first isomerate stream; and an outlet associated with a bottoms portion of the third divided wall column for recovery of a second isomerate stream. The illustrative method includes recovering isomerate from the third divided wall column.

BRIEF DESCRIPTION OF THE DRAWINGS

The disclosure is best understood from the following detailed description when read with the accompanying figures. It is emphasized that, in accordance with standard practice in the industry, various features are not drawn to scale. In fact, the dimensions of various features may be arbitrarily increased or reduced for clarity of discussion.

FIG. 3A illustrates a conventional naphtha splitter and FIG. 3B illustrates a DWC naphtha splitter according to aspects of the disclosure;

FIG. 4A illustrates a conventional splitter and FIG. 4B illustrates a DWC for LPG recovery according to aspects of the disclosure;

FIG. 5 illustrates an overhead heat integration between deisopentanizer and a deisohexanizer DWC according to aspects of the disclosure; and FIG. 6A illustrates conventional depentanizer and deisohexanizer columns FIG. 6B illustrates a depentanizer/deisohexanizer DWC according to aspects of the disclosure.

DETAILED DESCRIPTION

Figure 1:
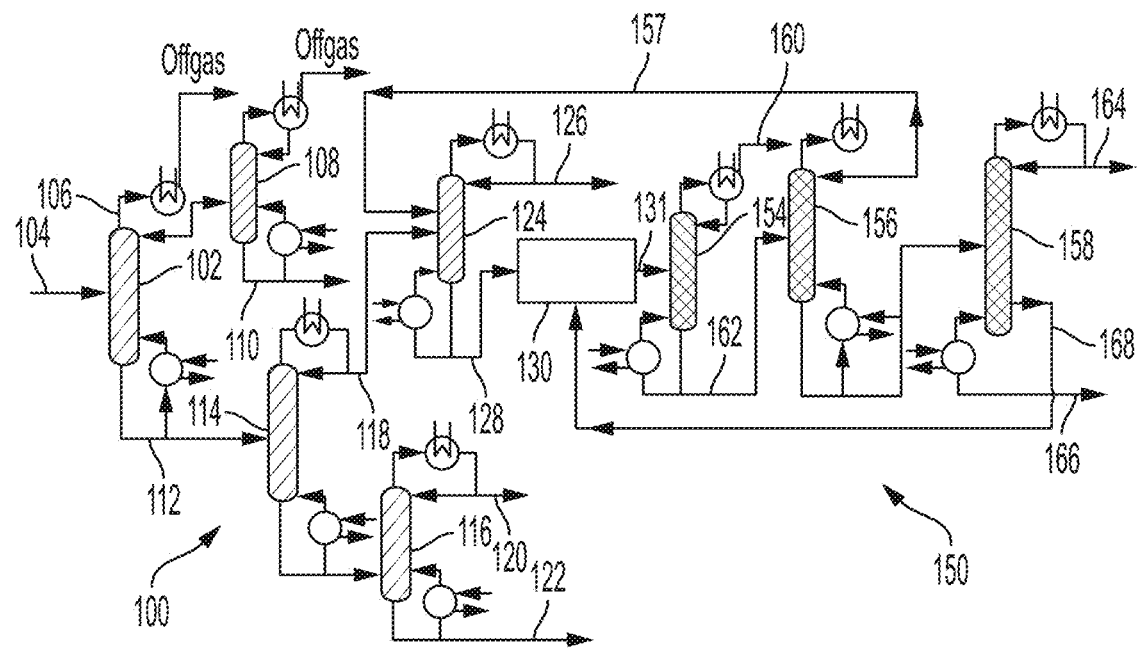
FIG. 1 illustrates a conventional naphtha hydrotreating and isomerization process scheme.

It is to be understood that the following disclosure provides many different embodiments, or examples, for implementing different features of various embodiments. Specific examples of components and arrangements are described below to simplify the disclosure. These are, of course, merely examples and are not intended to be limiting. In addition, the disclosure may repeat reference numerals and/or letters in the various examples. This repetition is for the purpose of simplicity and clarity and does not in itself dictate a relationship between the various embodiments and/or configurations discussed.

DWC technology can improve the efficiency and profitability of complex refinery units. One such area is complex processes, like naphtha hydrotreating (NHT) and isomerization (ISOM), which generally comprise a network of columns. Incorporation of DWC technology to combine two or more columns in NHT and ISOM processes to improve overall profitability is discussed herein.

NHT and ISOM units often operate at high pressures and temperatures that result in a costly and energy-intensive operation. With the demand for NHT and ISOM units ramping up in the refining industry, DWCs can revolutionize these process schemes. DWCs not only improve the energy efficiency of the processes, but DWC can also provide a host of other benefits. These benefits include lower capital investment and the need for a relatively smaller plot area as compared to full-fledged conventional schemes.

Process Background

In exemplary NHT units, such as NHT unit 100 of FIG. 1, a stabilizer column 102 removes non-condensable gases from a feed 104 from a reactor section. A top liquid product 106 is fed from stabilizer column 102 to deethanizer column 108 to recover liquefied petroleum gas (LPG) product 110. A bottoms product 112 is fed from stabilizer column 102 to a two-column naphtha splitter sequence comprising a first naphtha splitter 114 and a second naphtha splitter 116. The two-column naphtha splitter sequence separates a light naphtha (mostly C5-C6 components) 118, a mid-cut naphtha (C7) 120, and a heavy naphtha (C8 and heavier) 122. The light naphtha 118 is processed by a deisopentanizer column 124 to separate an i-C5 rich stream 126 from the top of deisopentanizer column 124. An n-C5 and heavier or bottoms fraction 128 is fed to an ISOM reactor 130.

In most process schemes, stabilizer column 102 operates at a high pressure, which requires the use of relatively expensive medium-pressure (MP) steam. Additionally, due to the use of partial condensation, significant C3-C4 losses are observed in the offgas. This leads to the use of the supplementary deethanizer column 108 to recover LPG product 110 from the offgas. An isomerization feed is prepared from the bottoms product 112 in the two-column naphtha splitter sequence.

Still referring to FIG. 1, an ISOM unit 150 comprises a multitude of columns including stabilizer column 154, depentanizer column 156, and deisohexanizer column 158. Deisopentanizer column 124 separates high-octane i-C5 126 components from the feed and recycle streams. Low-octane components (the n-C5 and heavier fraction 128) from deisopentanizer column 124 bottoms are sent to the ISOM reactor 130 to produce high-octane components, along with some light components. Product 131 from ISOM reactor 130 is fed to stabilizer column 154. Stabilizer column 154 removes lighter hydrocarbons (C4-) 160 in the offgas.

Stabilized isomerate 162 is fed to depentanizer column 156 to concentrate C5. C5 157 is recycled from depentanizer column 156 to deisopentanizer column 124. In some aspects, a portion of C5 157 is recycled to depentanizer column 156. Downstream deisohexanizer column 158 then separates a light isomerate 164 (mainly i-C6) and a heavy isomerate 166 (mainly C7+ cut), along with a concentrated n-C6 cut 168. The concentrated n-C6 cut 168 is recycled to ISOM reactor 130 for octane upgrading.

DWCs work on the principle of removing intrinsic thermodynamic design flaws in conventional distillation columns. One of these flaws arises due to back-mixing of the feed with a side cut based on a location of the two streams. Quality of the side cut is affected by contamination of lighter or heavier components. Using a DWC eliminates this problem and produces a better-quality side cut. Therefore, the two-naphtha-splitter operation of FIG. 1 is made possible in a single DWC of the instant invention. The series of columns of FIG. 1 present a good opportunity to incorporate DWC technology to improve the efficiency of the entire process. DWCs can be utilized to combine the operation of two or more columns while achieving the same product specifications as the conventional scheme. As a result, capital investment is lowered by 20%-30%. Moreover, these columns can either be operated at lower temperatures or have lower utility requirements. Energy savings in the range of 20%-30% are expected with a DWC configuration.

Dividing Wall Columns in NHT and ISOM Units

Figure 2:
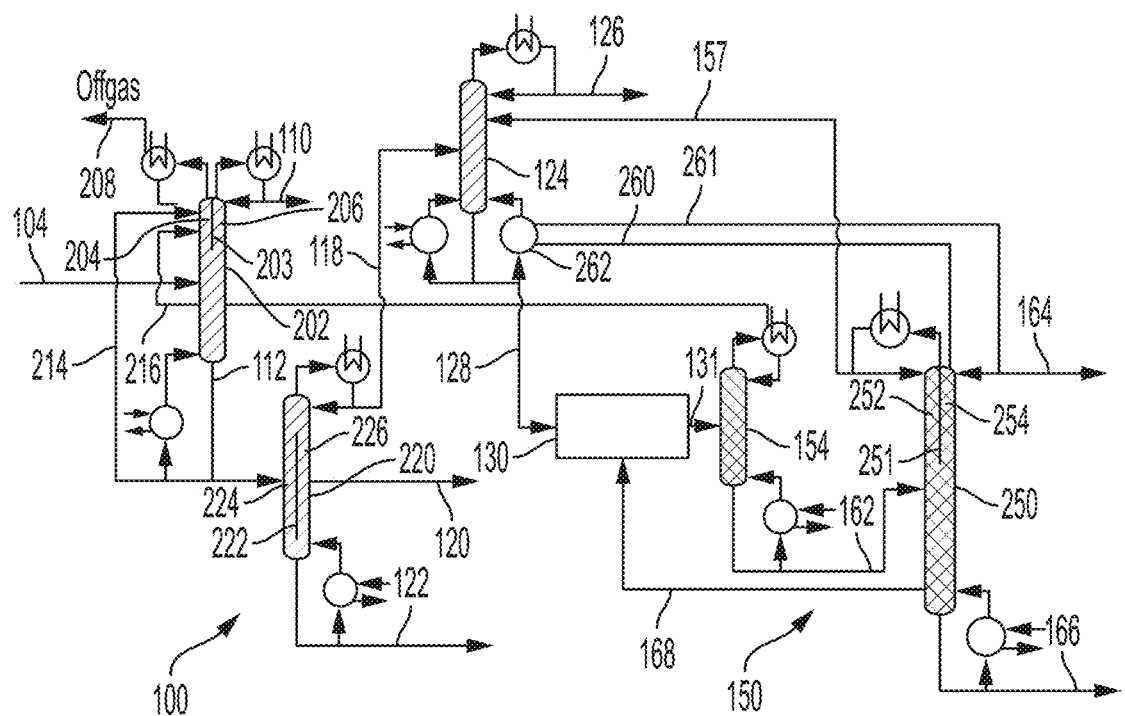
FIG. 2 illustrates a heat-integrated DWC process scheme for NHT and ISOM units according to aspects of the disclosure.

Compared to NHT unit 100 and ISOM unit 150 of FIG. 1, NHT unit 100 and ISOM unit 150 of FIG. 2 have been modified to include DWCs. For example: the stabilizer column 102 and the deethanizer 108 of FIG. 1 have been replaced with a top dividing wall LPG recovery column 202; the naphtha splitters 114, 116 have been replaced with a DWC naphtha splitter 220; and the depentanizer column 156 and the deisohexanizer column 158 have been replaced with a DWC depentanizer/deisohexanizer column 250. The top dividing wall LPG recovery column 202 includes within it a wall 203 that isolates a top portion of the top dividing wall LPG recovery column 202 into two halves (a top section 204 and a top section 206) that basically operate as independent columns. Wall 203 prevents any intermixing or leakage between the two sides. As a result, separate unit operations can be performed within the top dividing wall LPG recovery column 202.

FIGS. 3A and 3B illustrate a side-by-side comparison of the two naphtha splitters 114, 116 of FIG. 1 with DWC naphtha splitter 220 of FIG. 2. DWC naphtha splitter 220 has a middle wall 222 that divides DWC naphtha splitter 220 into two middle sections 224, 226. Bottoms product 112 from top dividing wall LPG recovery column 202 is fed to middle section 224 of DWC naphtha splitter 220. Light naphtha 118 is fed from a top of DWC naphtha splitter 220 to deisopentanizer 124. DWC naphtha splitter 220 also separates out mid-cut naphtha 120 as a side cut and heavy naphtha 122 as a bottoms product.

FIG. 4A illustrates a conventional stabilizer and FIG. 4B illustrates a DWC for LPG recovery according to aspects of the disclosure. The top dividing wall LPG recovery column 202 has a top wall 203 that divides the top dividing wall LPG recovery column 202 into two top sections 204, 206. Feed 104 and optionally ISOM stream 216 enters top section 204. In an embodiment of top dividing wall LPG recovery column 202, top section 204 is used for absorption and top section 206 is used for distillation. In addition, the parallel separation zones that have been created by wall 203 tend to minimize an overall height of top dividing wall LPG recovery column 202 as compared to the NHT unit 100 that includes individual columns (i.e., stabilizer column 102 and deethanizer column 108). A similar number of theoretical stages (or trays) can be accommodated in the two zones for a desired separation.

A heavy hydrocarbon stream strips offgas 208 of C3-C4 components from the absorption section 204 of top dividing wall LPG recovery column 202. These components are concentrated and removed on distillation side 206 as LPG product 110. A portion 214 of bottom product 112 from the top dividing wall LPG recovery column 202 can be recycled back to absorption section 204 and used for absorption if the feed contains a suitable amount of C5. Alternatively, a lean naphtha stream can be used alongside the heavier C5 stream or independently as the absorption medium. Other offgas streams in the refinery that are rich in C3-C4 components, such as an ISOM stream 216, can be fed to top dividing wall LPG recovery column 202 to improve LPG recovery (see FIG. 2 and FIG. 4). As a result, other stabilizers can be operated under relatively lower pressures and a lower-temperature heating utility.

FIG. 5 illustrates a top DWC concept that combines operation of depentanizer and deisohexanizer columns, such as depentanizer column 156 and deisohexanizer column 158. A first top section 252 of DWC depentanizer/deisohexanizer column 250 acts as a prefractionation column to concentrate C5 components (e.g., C5 components from stabilizer 154). Middle boiling components (C6) and heavy boiling components (C7 and heavier) are pushed down DWC depentanizer/deisohexanizer column 250 to a second top section 254 that acts as a main fractionation side. C6 isomerate is separated as top product 164 from top section 254. Concentrated n-C6 stream 168 is removed as a side cut from a location below a bottom of a dividing wall 251 and recycled to ISOM reactor 130. A bottom product of C7+ cut is obtained as heavy isomerate 166. In some embodiments, second top section 254 is heat-integrated with deisopentanizer column 124 via lines 260, 261. Lines 260, 261 are coupled to a heat exchanger 262 that exchanges heat between a fluid from second top section 254 and a bottoms product of deisopentanizer column 124. FIG. 2-6 illustrate other heat exchangers associated with the depicted columns. In various embodiments, these heat exchangers can be used as needed to transfer heat between fluids of the processes described herein. FIG. 6A illustrates conventional depentanizer and deisohexanizer columns FIG. 6B illustrates a depentanizer/deisohexanizer DWC according to aspects of the disclosure.

For regions with high utility costs, further energy savings are possible through the overhead heat integration of a top DWC (e.g., see FIGS. 5 and 6). The DWC depentanizer/deisohexanizer column 250 operates at an elevated pressure. As a result, hot overhead vapors on the main fractionation side 254 can be used to provide heating duty to the deisopentanizer column 124 in the NHT unit (See FIGS. 5 and 6). The stream is capable of providing the entire duty required by the deisopentanizer column 124; otherwise, the column typically operates on low-pressure steam.

In various embodiments, aspects of FIGS. 2-6 may be incorporated into the NHT unit 100 and the ISOM unit 150 to create new systems that include the inventive DWCs discussed herein.

Benefits of a network of DWCs in NHT and ISOM units are summarized in TABLES 1 and 2 below:

TABLE 1

Equipment Count, CAPEX and OPEX Comparison

| Parameters | Units | Conventional Design | DWC Design |
|---|---|---|---|
| No. of Columns | — | 8 | 5 |
| Energy Savings | % | — | 24% |
| Capital Cost | % | Base | 70% of Base |

TABLE 2

Heating Utility Comparison

| Parameters | Units | Conventional Design | Instant DWC with Heat Integration |
|---|---|---|---|
| Feed Rate to NHT Unit | TPH | 57 | 57 |
| Isomerate product | TPH | 28.6 | 28.6 |
| RON of isomerate product | — | 92 | 92 |
| LPG Product Rate | TPH | 5.00 | 7.5 |
| Off Gas Rate | TPH | 3.7 | 1.2 |
| NHT Stabilizer | MMKcal/hr | 7.0 | 7.3 |
| Deethanizer | MMKcal/hr | 2.0 | |
| Naphtha Splitter 1 & 2 | MMKcal/hr | 16.6 | 13.3 |
| Deisopentanizer | MMKcal/hr | 12.7 | 0.9 |
| ISOM Stabilizer | MMKcal/hr | 3.0 | 3.0 |
| Depentanizer | MMKcal/hr | 8.0 | 20.9 |
| Deisohexanizer | MMKcal/hr | 10.4 | |
| Total Heating Duty | MMKcal/hr | 59.7 | 45.4 |

DWCs provide an innovative method of reducing the capital and energy costs of complex refinery processes such as isomerization and naphtha hydrotreating. Integrating DWC technology into an NHT/ISOM process scheme can provide substantial benefits, including: a lesser number of columns and associated equipment for the entire configuration; improved LPG recovery; reduced energy costs due to low temperature utility used for heating; and better heat integration within the columns.

The term "substantially" is defined as largely but not necessarily wholly what is specified (and includes what is specified; e.g., substantially 90 degrees includes 90 degrees and substantially parallel includes parallel), as understood by a person of ordinary skill in the art. In any disclosed embodiment, the terms "substantially," "approximately," "generally," and "about" may be substituted with "within [a percentage] of" what is specified, where the percentage includes 0.1, 1, 5, and 10 percent.

The foregoing outlines features of several embodiments so that those skilled in the art may better understand the aspects of the disclosure. Those skilled in the art should appreciate that they may readily use the disclosure as a basis for designing or modifying other processes and structures for carrying out the same purposes and/or achieving the same advantages of the embodiments introduced herein. Those skilled in the art should also realize that such equivalent constructions do not depart from the spirit and scope of the disclosure, and that they may make various changes, substitutions and alterations herein without departing from the spirit and scope of the disclosure. The scope of the invention should be determined only by the language of the claims that follow. The term "comprising" within the claims is intended to mean "including at least" such that the recited listing of elements in a claim are an open group. The terms "a," "an" and other singular terms are intended to include the plural forms thereof unless specifically excluded.

What is claimed is:

1. A processing unit comprising:
    a naphtha hydrotreating unit comprising a first divided wall column, a naphtha splitter system, and a deisopentanizer column;
    wherein the first divided wall column comprises:
        a wall dividing a top portion of the first divided wall column into a first top section and a second top section;
        an outlet associated with the second top section of the first divided wall column for recovery of liquid petroleum gas; and an outlet associated with a bottoms portion of the first divided wall column and coupled to the naphtha splitter system;

wherein the deisopentanizer column is coupled to an output of the naphtha splitter system;

an isomerization unit coupled to an outlet of the deisopentanizer column and comprising a second divided wall column and a stabilizer column;

wherein the second divided wall column comprises:

a wall dividing a top portion of the second divided wall column into a first top section and a second top section;

an inlet coupled to an outlet of a stabilizer column of the isomerization unit;

an outlet associated with the second top section of the second divided wall column for recovery of a first isomerate stream; and an outlet associated with a bottoms portion of the second divided wall column for recovery of a second isomerate stream;

wherein the stabilizer column comprises an outlet associated with a bottom section of the stabilizer column and coupled to the second divided wall column and an outlet associated with a top section of the stabilizer column and coupled to the first top section of the first divided wall column; and an isomerization reactor coupled between the deisopentanizer column and the stabilizer column.

2. The processing unit of claim 1, wherein the naphtha splitter system comprises a third divided wall column, the third divided wall column comprising:

a wall dividing a middle portion of the third divided wall column into a first middle section and a second middle section;

an inlet coupled to the bottoms portion of the first divided wall column;

an outlet associated with a top portion of the third divided wall column for recovery of a first naphtha stream;

an outlet associated with the second middle section for recovery of a second naphtha stream; and an outlet associated with a bottoms portion of the third divided wall column for recovery of a third naphtha stream.

3. The processing unit of claim 1, wherein the stabilizer column is coupled to an outlet of the isomerization reactor.

4. The processing unit of claim 1, wherein the isomerization reactor is coupled to the bottoms portion of the second divided wall column.

5. The processing unit of claim 1, wherein the second divided wall column is heat integrated with the deisopentanizer column.

6. The processing unit of claim 1, further comprising an inlet associated with the first top section of the first divided wall column and coupled to the bottoms portion of the first divided wall column.

7. The processing unit of claim 1, further comprising an outlet associated with the top of the second divided wall column and coupled to the deisopentanizer column.

8. The processing unit of claim 1, wherein the first top section of the first divided wall column is configured to perform as a stabilizer and the second top section of the first divided wall column is configured to perform as deethanizer.

9. The processing unit of claim 1, wherein the first top section of the second divided wall column is configured to perform as a depentanizer and the second top section of the second divided wall column is configured to perform as a deisohexanizer.

10. An integrated hydrocarbon conversion process for use in a system comprising a naphtha hydrotreating unit and an isomerization unit, the process comprising:

providing a feed to a first divided wall column, the first divided wall column comprising:

a wall dividing a top portion of the first divided wall column into a first top section and a second top section;

an outlet associated with the second top section of the first divided wall column for recovery of liquid petroleum gas; and an outlet associated with a bottoms portion of the first divided wall column and coupled to a naphtha splitter system;

removing liquid petroleum gas from the second top section of the first divided wall column;

feeding a bottoms product from the first divided wall column to a second divided wall column, the second divided wall column comprising:

a wall dividing a middle portion of the second divided wall column into a first middle section and a second middle section;

an inlet coupled to the bottoms portion of the first divided wall column;

an outlet associated with a top portion of the second divided wall column for recovery of a first naphtha stream;

an outlet associated with the second middle section for recovery of a second naphtha stream; and an outlet associated with a bottoms portion of the second divided wall column for recovery of a third naphtha stream;

feeding the first naphtha stream from the top portion of the second divided wall column to a deisopentanizer column;

feeding a bottoms fraction from the deisopentanizer column to an isomerization reactor;

feeding a product from the isomerization reactor to a stabilizer column;

feeding a first stabilized isomerate from the stabilizer column to a third divided wall column, the third divided wall column comprising:

a wall dividing a top portion of the third divided wall column into a first top section and a second top section;

an inlet coupled to an outlet of a stabilizer column of the isomerization unit;

an outlet associated with the second top section of the third divided wall column for recovery of a first isomerate stream; and an outlet associated with a bottoms portion of the third divided wall column for recovery of a second isomerate stream;

feeding a second stabilized isomerate from the stabilizer column to the first top section of the first divided wall column; and recovering isomerate from the third divided wall column.

11. The process of claim 10, further comprising exchanging heat between a fluid from the second top section of the third divided wall column and a bottoms product of the deisopentanizer column.

12. The process of claim 10, further comprising feeding a C5-containing stream from the first top section of the third divided wall column to the deisopentanizer column.

13. The process of claim 10, further comprising feeding a C6-containing stream from the third divided wall column to the isomerization reactor.

14. The process of claim 10, further comprising feeding a bottoms product of the first divided wall column to the first top section of the first divided wall column.

15. The process of claim 10, wherein the second divided wall column is heat integrated with the deisopentanizer column.

16. The process of claim 10, wherein the first divided wall column further comprises an inlet associated with the first top section of the first divided wall column and coupled to the bottoms portion of the first divided wall column.

17. The process of claim 10, wherein the second divided wall column further comprises an outlet associated with the top of the second divided wall column that is coupled to the deisopentanizer column.

18. The process of claim 10, wherein the first top section of the first divided wall column is configured to perform as a stabilizer and the second top section of the first divided wall column is configured to perform as deethanizer.

19. The process of claim 10, wherein the first top section of the third divided wall column is configured to perform as a depentanizer and the second top section of the third divided wall column is configured to perform as a deisohexanizer.

* * * * *